(12) United States Patent
Ebihara

(10) Patent No.: US 6,563,497 B1
(45) Date of Patent: May 13, 2003

(54) IMAGE PROCESSING APPARATUS

(75) Inventor: Hitoshi Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/299,821

(22) Filed: Apr. 26, 1999

(30) Foreign Application Priority Data

May 15, 1998 (JP) .......................................... 10-132854

(51) Int. Cl.[7] .............................................. G06T 17/00
(52) U.S. Cl. ...................................................... 345/419
(58) Field of Search ................................ 348/584, 585, 348/587; 345/418, 419, 420, 428, 429; 463/4

(56) References Cited

U.S. PATENT DOCUMENTS

| 4,684,990 A | | 8/1987 | Oxley ........................ 358/183 |
| 5,742,295 A | | 4/1998 | Lindholm ................... 345/427 |
| 5,825,433 A | * | 10/1998 | Yamada et al. ............. 348/584 |
| 5,886,701 A | * | 3/1999 | Chauvin et al. ............ 345/418 |
| 6,057,849 A | * | 5/2000 | Haubner et al. ............ 345/428 |
| 6,155,924 A | * | 12/2000 | Nakagawa et al. ............ 463/4 |

FOREIGN PATENT DOCUMENTS

| EP | 0449469 A2 | 10/1991 | |
| GB | 2254749 A | 10/1992 | |
| JP | 63-289686 | 11/1988 | ........... G06F/15/72 |
| JP | 64-21684 | 1/1989 | ........... G06F/15/72 |
| JP | 3-191485 | 8/1991 | ........... G06F/15/72 |
| JP | 6-162214 | 6/1994 | ........... G06F/15/72 |
| JP | 6-162215 | 6/1994 | ........... G06F/15/72 |
| JP | 6-301792 | 10/1994 | ........... G06F/15/72 |
| JP | 7-21407 | 1/1995 | ........... G06T/15/00 |
| JP | 7-85308 | 3/1995 | ........... G06T/15/00 |
| JP | 7-114654 | 5/1995 | ........... G06T/15/40 |
| JP | 7-282290 | 10/1995 | ........... G06T/15/00 |
| JP | 8-161510 | 6/1996 | ........... G06T/11/00 |

OTHER PUBLICATIONS

Foley, Computer Graphics: Principles and Practice, 1990, Addison–Wesley, 2nd ed.*
U.S. patent application Ser. No. 09/124,400, filed Jul. 29, 1998.

* cited by examiner

Primary Examiner—Cliff N. Vo
(74) Attorney, Agent, or Firm—Bell, Boyd & Lloyd LLC

(57) ABSTRACT

In a controller, a three-dimensional shape defined by at least one polygon is set on the basis of a signal from an input unit, and in a three-dimensional rendering unit, a three-dimensional image corresponding to the three-dimensional shape is rendered on the basis of a vertex of the polygon forming the three-dimensional shape, a pixel value at the vertex, and the like. The three-dimensional image is outputted as a key signal to a mixing unit for mixing images. Thus, various key signals are generated at high speed.

10 Claims, 14 Drawing Sheets

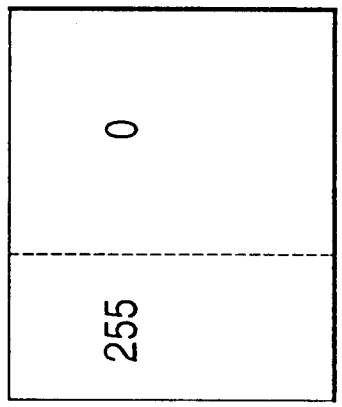
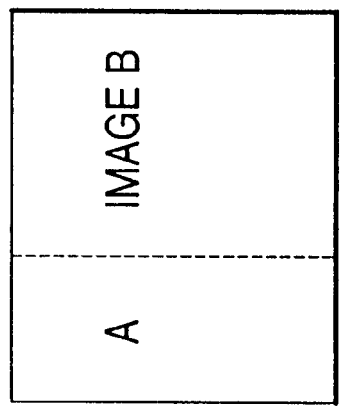
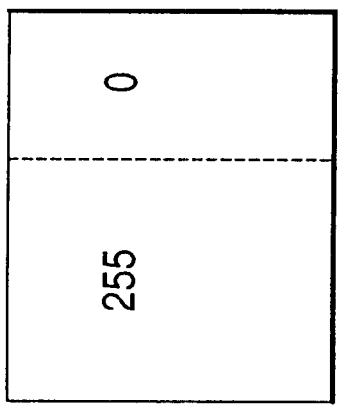
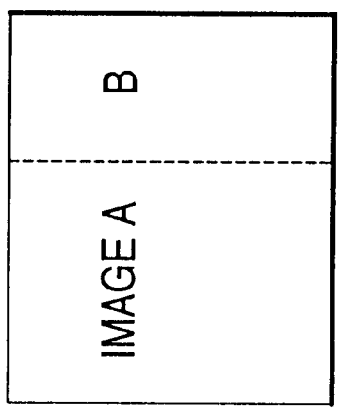
FIG. 7A
PRIOR ART
FIG. 7B
PRIOR ART

IMAGE PROCESSING APPARATUS

BACKGROUND OF THE INVENTION

1. Field of the Invention

The present invention relates to an image processing apparatus, and particularly to an image processing apparatus which can easily generate a variety of signals as key signals used at mixing of images.

2. Description of the Related Art

FIG. 1 shows a structure of an example of a conventional video switcher as an image mixing system which mixes two images in accordance with a key signal and outputs a mixed image.

In this video switcher, a key signal which controls a ratio of mixing (transmittance of one image to the other image when the two images are mixed) for every pixel and has a value within the range of from 0 to 1, is generated, and images A and image B are mixed in accordance with the key signal.

That is, an input unit 1 includes a button, a dial, a lever and the like for specifying patterns and parameters of various wipes. When a user operates the button and the like for a pattern and parameter of a desired wipe, a signal corresponding to the operation is outputted to a controller 31. When receiving the signal from the input unit 1, the controller 31 controls a key signal generating unit 32 based on the signal, so that the key signal generating unit 32 is made to generate a key signal for executing the wipe. This key signal is supplied to a mixing unit (image mixing unit) 4. The image mixing unit 4 is supplied with not only the key signal but also two images A and B as objects of mixing. When receiving the key signal from the key signal generating unit 32, the image mixing unit 4 mixes the images A and B in accordance with the key signal and outputs a mixed image C obtained as the result of mixing.

FIG. 2 shows a structural example of the key signal generating unit 32 in the video switcher of FIG. 1.

In FIG. 2, the key signal generating unit 32 is constituted by a command buffer 41, a general-purpose CPU (Central Processing Unit) 42, a program memory 43, and a key signal storing memory 44.

The command buffer 41 is supplied, from the controller 31, with a command to the general-purpose CPU 42 and other data necessary for generating a key signal, and the command buffer 41 temporarily stores the command or the like from the controller 31. The general-purpose CPU 42 reads the command stored in the command buffer 41, and executes one of the programs stored in the program memory (internal ROM (Read Only Memory) 43, which corresponds to the command read from the command buffer 41. By this, the general-purpose CPU 42 generates a key signal, and stores the key signal corresponding to each pixel in the key signal storing memory 44. The key signal storing memory 44 is composed of, for example, a dual-port memory with storage capacity corresponding to pixels of one screen, temporarily stores key signals for the respective pixels of one screen from the general-purpose CPU 42, and supplies them to the mixing unit 4. Incidentally, the program memory 43 can be made built in the general-purpose CPU 42.

Next, FIG. 3 shows a structural example of the controller 31 in the video switcher of FIG. 1.

The controller 31 is mainly constituted by a CPU 51 and a program memory 52. The CPU 51 executes a program stored in the program memory 52 in response to a signal from the input unit 1, so that it performs a process for controlling the key signal generating unit 32.

That is, the program memory 52 stores a key selecting program for carrying out a key selecting process. The CPU 51 executes the key selecting program in accordance with a signal from the input unit 1, so that it performs the key selecting process for generating a key number (key No.) which identifies a shape pattern of a key signal to be generated by the key signal generating unit 32, and for generating a parameter which specifies the state of the key signal (for example, size, position, etc. of the key signal) and the way of changing the key signal (rotation angle, amount of parallel movement, etc.). The CPU 51 supplies, as a command, the key number and parameter obtained as the result of the key selecting process to the key signal generating unit 32.

The program memory 43 of the key signal generating unit 32 stores key signal generating programs for performing key signal generating processes. That is, the program memory 43 stores the key signal generating programs each generating a key signal of a shape pattern corresponding to each key number. When receiving a key number and parameter from the controller 31, the CPU 42 of the key signal generating unit 32 executes the key signal generating program corresponding to the key number in accordance with the parameter from the controller 31. By this, a key signal in which its shape pattern is specified by the key number and its state and way of changing are specified by the parameter, is generated and is stored in the key signal storing memory 44.

Next, with reference to the flowchart of FIG. 4, the key selecting process executed by the CPU 51 of FIG. 3 will be described further.

In the key selecting process, when the user operates the input unit 1 and a signal corresponding to the operation is supplied to the CPU 51, at step S31, the CPU 51 determines the shape pattern of the key signal in accordance with the signal, and further, at step S32, determines the parameter for specifying the state of the key signal and the way of changing the key signal. Then, the CPU 51 proceeds to step S33, and transmits the key number, which corresponds to the shape pattern of the key signal determined at step S31, and the parameter determined at step S32 to the key signal generating unit 32. Next, the CPU waits for supply of a signal corresponding to operation of the user from the input unit 1 and returns to step S31.

Next, with reference to the flowchart of FIG. 5, the key signal generating process performed by the CPU 42 of FIG. 3 (FIG. 2) will be further described.

In the key signal generating process, first of all, at step 41, the CPU 42 receives the key number and the parameter transmitted from the controller 31, proceeds to step S42, and reads out one (hereinafter, referred to suitably as individual pattern generating program) of the key signal generating programs stored in the program memory 43 which corresponds to the key number from the controller 31. Further, at step S42, the CPU 42 executes the individual pattern generating program in accordance with the parameter from the controller 31. By this, the CPU 42 generates such a key signal that its shape pattern is specified by the key number and its state and way of changing are specified by the parameter. The CPU 42 stores this key signal in the key signal storing memory 44, and then, waits for a key number and parameter transmitted from the controller 31 and returns to step S41.

Next, with reference to FIG. 6, the process of the mixing unit 4 of FIG. 1 will be described.

For example, in the key signal generating unit 32, when a star-shaped key signal K is generated, and is inputted, together with images A and B, into the mixing unit 4, the images A and B are mixed in the mixing unit 4 in accordance with the key signal K so that a mixed image C is formed.

Now, it is assumed that a pixel at an x-th position from the left of a screen and at a y-th position from the above is expressed by p(x, y), and pixel values of the images A, B, and C at the pixel p(x, y) are expressed by a(x, y), b (x, y), and c(x, y), respectively. Besides, it is assumed that a value of the key signal K at the pixel p(x, y) is expressed by k(x, y). When the key signal k(x, y) is expressed by, for example, 8 bits, in the mixing unit 4, the pixel value c(x, y) of the image C is obtained in accordance with, for example, the following equation.

$$c(x, y) = (k(x, y)a(x, y) + (255 - k(x, y))b(x, y))/255 \quad (1)$$

In the key signal K, the value k(x, y) of a white star-shaped portion corresponds to 255, and the value k(x, y) of a black portion corresponds to 0, respectively. By this, in the mixed image C, the image A appears at the portion corresponding to the white star-shaped portion in the key signal K, and the image B appears at the portion corresponding to the black portion in the key signal K.

In the case shown in FIG. 6, for example, if the area of the white star-shaped portion in the key signal K is made gradually small, in the mixed image C, the portion where the image A is displayed becomes gradually small, and finally, only the image B is displayed. Thus, by changing the key signal K in such a manner, it is possible to realize a wipe process in which display portions of the images A and B are divided by the star, and the image A is gradually changed to the image B. Incidentally, in FIG. 6, although the shape of the key signal K is made star-shaped, even if other shapes are used, a similar wipe process can be carried out.

Besides, for example, as shown in FIG. 7A, in the case where the right side or left side of the key signal K is made 0 or 255, and the boundary portion between 0 and 255 is gradually moved from the right to left, as shown in FIG. 7B, it is possible to perform such a wipe process that the image A is gradually changed to the image B from the right to the left. Incidentally, if the boundary portion between 0 and 255 in the key signal K is, for example, gradually changed from 0 to 255, or is made 128 or the like of the intermediate value, the boundary portion between the image A and the image B becomes such that the two images A and B become semi-transparent and are mixed to each other.

Further, for example, as shown in FIG. 8, if a key signal K of such an animation that a star rises from the depth side to this side is generated, for example, it is possible to perform such a wipe process that the image B divided by the star rises from the image A.

Besides, for example, if the values of the key signals K for all pixels are gradually changed from 255 to 0, it is possible to realize a so-called gradation wipe such that only the image A is first displayed, then the images A and B become semitransparent to form a blended state, and only the image B is finally displayed.

As described above, a wipe can be realized by mixing the images A and B while changing the values of the key signals K for the respective pixels. Thus, it is necessary to change the key signal K in real time in order to carry out such a wipe process that an image is blended with another image and finally changed to the other image, or another image appears from the center portion of one image, its area is gradually increased, and finally, the one image is changed to the other image.

However, for generating the key signal, it takes a time corresponding to the complexity and the like of a wipe which is to be realized by the key signal. Thus, patterns of wipes which the video switcher can realize with the key signals which can be generated by the CPU 42 of the key signal generating unit 32 in real time, are restricted. Specifically, in the case where a memory with capacity for one screen is used for the key signal storing memory 44, the key signal must be generated in the vertical return line interval. Even in the case where a memory with capacity for two screens is used, as a so-called double buffer structure, for the key signal storing memory 44, the key signal must be generated in a time of one screen (in a time from a vertical synchronizing signal to a next vertical synchronizing signal).

If a CPU with higher speed is used as the CPU 42, it is possible to attain high speed generation of the key signal. However, the CPU 42 is generally a general-purpose CPU, and does not have a specific function for writing the key signal into the key signal storing memory 44. Thus, it can not be said to be excellent in cost merit to use a high speed CPU as such a general-purpose CPU. That is, although a general-purpose CPU becomes expensive as its speed becomes high, only part of the increase of cost is reflected to the increase of speed of generation of the key signal.

In the conventional video switcher, as shown in FIG. 3, for example, key signal generating programs for generating key signals with predetermined shape patterns are stored in the program memory 43 as an internal ROM or the like, and a key signal generating program corresponding to a key number supplied from the controller 31 is executed, so that a key signal with a predetermined shape is generated. Thus, it is difficult to generate a key signal with a shape corresponding to a key signal generating program which is not stored in the program memory 43, and it is not easy to add a key signal generating program for generating a key signal with a new shape into the program memory 43 of the ROM. Further, the key signal generating program often depends on the inner structure of the key signal generating unit 32 as a platform, that is, especially on the CPU 42, and its portability is low. Thus, for example, it is poor in productivity to prepare a key signal generating program for generating a key signal which has a shape and the like meeting the request of the user, and a result, the key signal generating program becomes expensive. Further, in the case where a new key signal generating program is added, a key selecting program (FIG. 3) for giving a key number and parameter to the key signal program must be also changed, so that management of programs becomes troublesome.

From the above, in the conventional video switcher, it has been actually impossible to generate a key signal with a shape and so forth corresponding to a key signal generating program which is not stored in the program memory 43.

Further, as shown in FIG. 8, in the case where a key signal K of such an animation that a star rises in the direction from the depth side to this side is generated, according to the foregoing, it is necessary that a key signal generating program for forming the animation is stored in the program memory 43. However, since the program memory 43 stores programs for generating key signals of other shapes, the size of data of one program is restricted. On the other hand, a program for rendering such a three-dimensional image that the star rises in the direction from the depth side to this side has generally a large amount of data, and it is difficult to store such a program in the program memory 43. Thus, in the conventional video switcher, such an animation that the star rises in the direction from the depth side to this side is frequently substituted by a two-dimensional animation such that a collapsed star in the up-and-down direction gradually extends in the up-and-down direction as shown in FIG. 8.

Besides, as a method of realizing a three-dimensional animation, there is such a method that calculation for generating a three-dimensional image is carried out on the basis of patterns of some predetermined motions, a table containing its result converted into two-dimensional system one is prepared, and a two-dimensional key signal is generated using the table. However, in this method, it is impossible to realize motions other than those registered in the table, so that a mixed image obtained by this is poor in the degree of freedom of expression.

SUMMARY OF THE INVENTION

The present invention has been made in view of such circumstances, and an object of the invention is therefore to provide an image processing apparatus in which various key signals can be generated at high speed and further, by this, a mixed image with high degree of freedom of expression can be obtained.

According to a first aspect of the present invention, an image processing apparatus for mixing a first image and a second image comprises: rendering command generating means for generating a rendering command for setting a three-dimensional shape defined by at least one unit figure; an image memory; rendering means for rendering a three-dimensional image corresponding to the three-dimensional shape onto the image memory based on the rendering command; and output means for outputting the three-dimensional image rendered on the image memory as a key signal; mixing means for mixing said first image and said second image in accordance with the key signal.

In the image processing apparatus of the first aspect, the rendering means is a three-dimensional rendering unit.

Beside, in the image processing apparatus, the three-dimensional image is formed of a plurality of polygons.

Besides, in the image processing apparatus, the rendering command includes at least coordinate and color information of each vertex of the polygons in a three-dimensional space.

According to a second aspect of the present invention, an image processing apparatus for generating a key signal as a signal for controlling transmittance of an image when a first image and a second image are mixed, comprises rendering command generating means for generating a rendering command for setting a three-dimensional shape defined by at least one unit figure; an image memory; rendering means for rendering a three-dimensional image corresponding to the three-dimensional shape onto the image memory based on the rendering command; and output means for outputting the three-dimensional image rendered on the image memory as the key signal.

In the image processing apparatus of the second aspect, the rendering means is a three-dimensional rendering unit.

Besides, in the image processing apparatus, the three-dimensional image is formed of a plurality of polygons.

Besides, in the image processing apparatus, the rendering command includes at least coordinate and color information of each vertex of the polygons in a three-dimensional space.

According to a third aspect of the present invention, an image processing apparatus for mixing a first image and a second image comprises: an image memory; receiving means for receiving a rendering command for setting a three-dimensional shape defined by at least one unit figure; rendering means for rendering a three-dimensional image corresponding to the three-dimensional shape onto the image memory based on the rendering command; and output means for outputting the three-dimensional image rendered on the image memory as a key signal; mixing means for mixing said first image and said second image in accordance with the key signal.

In the image processing apparatus of the third aspect, the rendering means is a three-dimensional rendering unit.

Besides, in the image processing apparatus, the three-dimensional image is formed of a plurality of polygons.

Besides, in the image processing apparatus, the rendering command includes coordinate and color information of each vertex of the polygons in a three-dimensional space.

According to a fourth aspect of the present invention, an image processing method for mixing a first image and a second image comprises the steps of: generating a rendering command for setting a three-dimensional shape defined by at least one unit figure; rendering a three-dimensional image corresponding to the three-dimensional shape onto the image memory based on the rendering command; outputting the three-dimensional image rendered on the image memory as a key signal; and mixing the first image and the second image in accordance with the key signal.

BRIEF DESCRIPTION OF THE DRAWINGS

FIGS. 7A and 7B are views showing a wipe in which an image A is gradually changed to an image B from the right to the left.

DETAILED DESCRIPTION OF THE PREFERRED EMBODIMENTS

Figure 9:
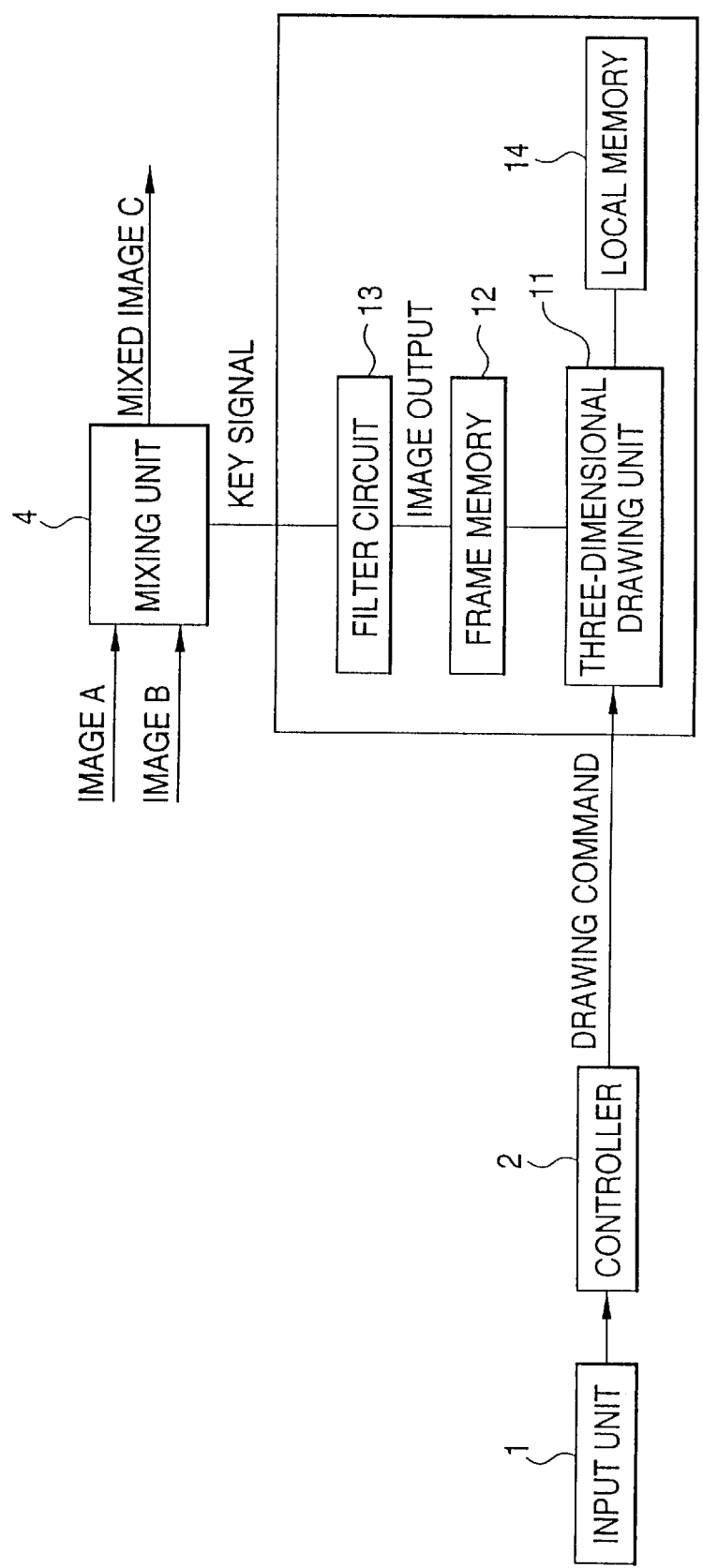
FIG. 9 is a block diagram showing a structural example of an embodiment of a video switcher to which the present invention is applied.

FIG. 9 shows a structural example of an embodiment of a video switcher to which the present invention is applied. Incidentally, in the drawing, portions corresponding to those in FIG. 1 are denoted by the same reference characters.

Figure 1:
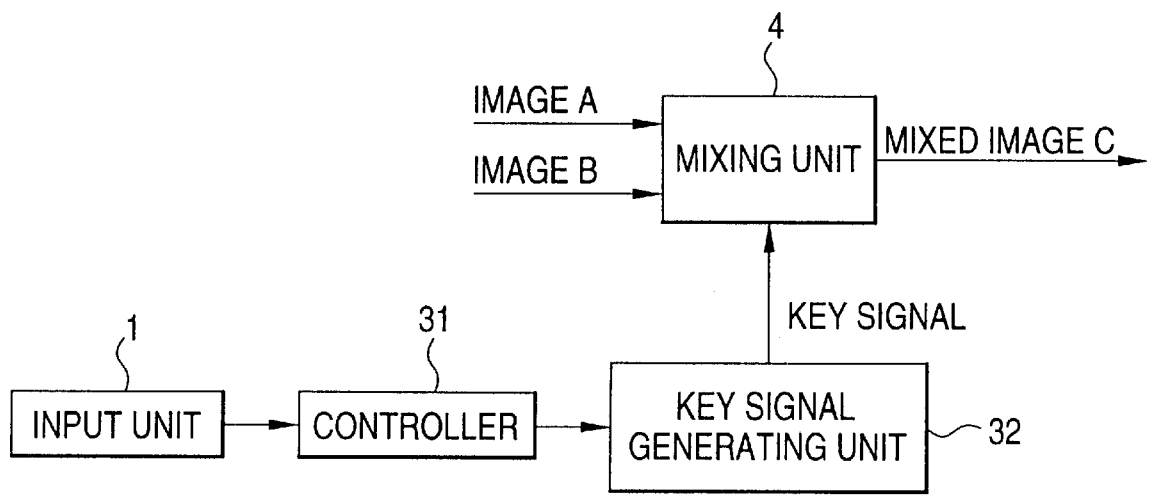
FIG. 1 is a block diagram showing a structure of an example of a conventional video switcher.

An input unit 1 includes, as described in FIG. 1, a button, a dial, a lever, etc. for specifying various wipe patterns and parameters. When a user operates the button and the like for specifying a desired wipe pattern and parameter, a signal corresponding to the operation is outputted to a controller 2. When receiving the signal from the input unit 1, the controller 2 controls a key signal generating unit 3 on the basis of the signal, and this makes the key signal generating unit 3 generate a key signal performing a wipe.

That is, in response to the signal from the input unit 1, the controller 2 sets, for example, a three-dimensional shape defined by at least one polygon (unit figure), and supplies the key signal generating unit 3 with a rendering command for rendering the three-dimensional shape.

In the embodiment of FIG. 9, the key signal generating unit 3 is constituted by a three-dimensional rendering unit 11, a frame memory (key signal storing memory) 12, a filter circuit 13, and a local memory 14, and the rendering command from the controller 2 is given to the three-dimensional rendering unit 11.

The three-dimensional rendering unit 11 is a special-purpose device (for example, LSI (Large Scale Integration)) for rendering a three-dimensional image. Although this unit is inferior to the CPU 42 of the key signal generating unit 32 shown in FIG. 2 in general-purpose properties, it is provided with a high function for rendering of a three-dimensional image into the frame memory 12. As the three-dimensional rendering unit, for example, "glintMx" as a 3D chip made by 3Dlabs Co. or the like may be used. The three-dimensional rendering unit 11 executes a program for rendering a three-dimensional image stored in the local memory 14, so that it writes the three-dimensional image corresponding to a rendering command from the controller 2 into the frame memory 12. That is, by this, the three-dimensional image corresponding to the three-dimensional shape set by the controller 2 is written into the frame memory 12. The frame memory 12 outputs, as a key signal, the three-dimensional image by the three-dimensional rendering unit 11 to the filter circuit 13. The filter circuit 13 performs filtering for decreasing jag (aliasing noise) or the like to the three-dimensional image as the key signal from the frame memory 12, and outputs the key signal to a mixing unit 4.

The mixing unit 4 mixes images A and B on the basis of the key signal supplied in the manner as described above, and generates a mixed image C.

Figure 10:
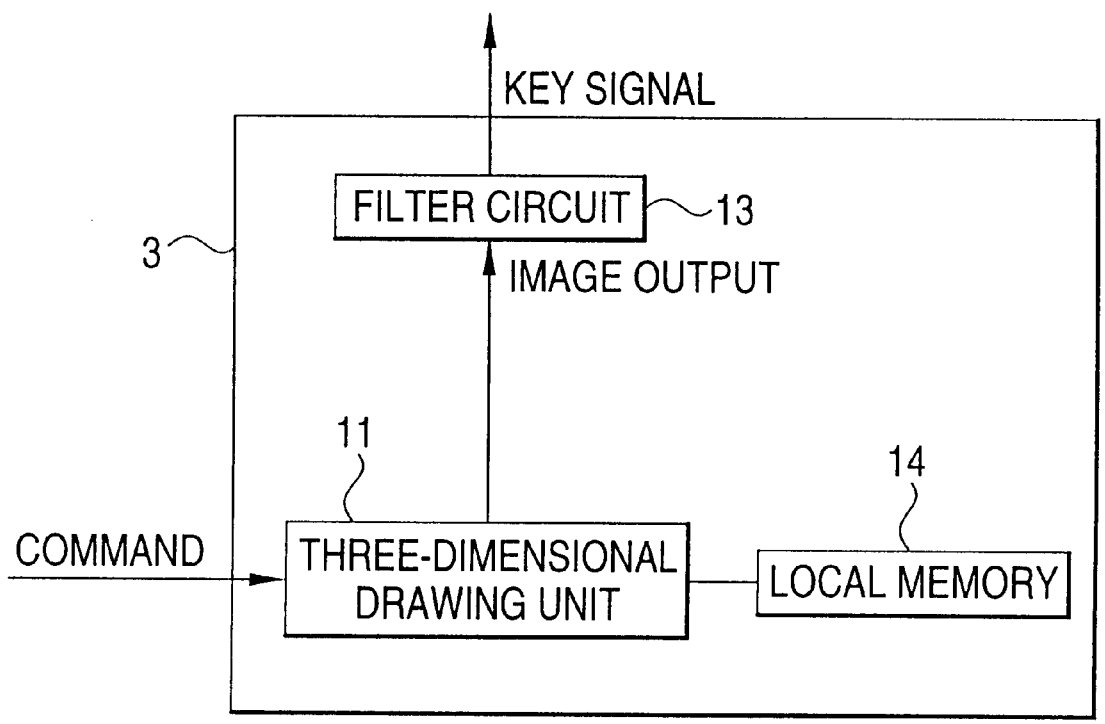
FIG. 10 is a block diagram showing a structural example of a key signal generating unit 3.

Incidentally, the controller 2 can be realized as a special-purpose unit, or can also be realized by using a general-purpose personal computer or the like. The key signal generating unit 3 can be realized, for example, as one separate unit or may be structured as a board which can be mounted on the controller 2. The local memory 14 can be built in the three-dimensional rendering unit 11. Besides, the frame memory 12 can also be built in the three-dimensional rendering unit 11. Here, a structural example of the key signal generating unit 3 in the case where the frame memory 12 is built in the three-dimensional rendering unit 11, is shown in FIG. 10.

Figure 11:
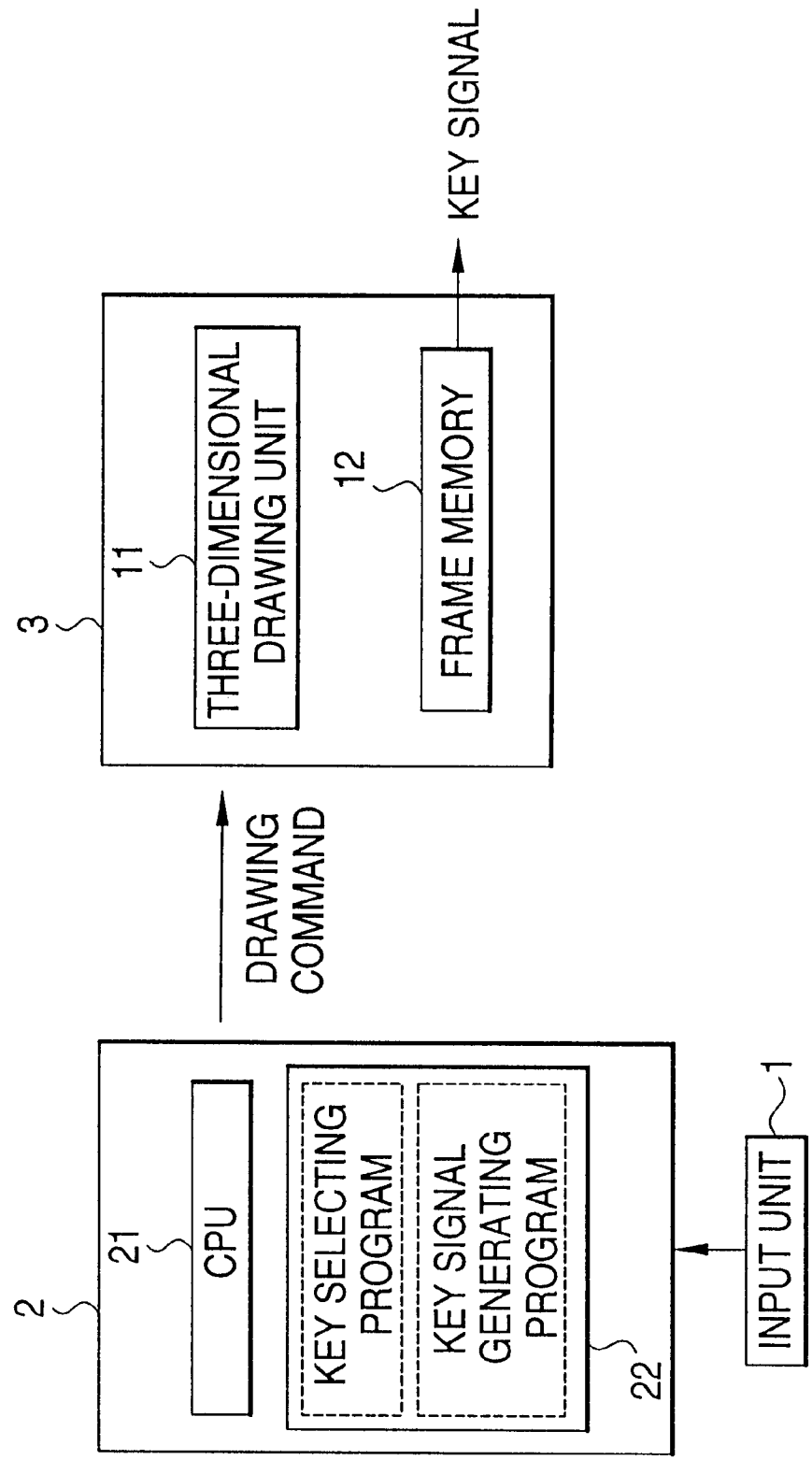
FIG. 11 is a block diagram showing a structural example of a controller 2.

FIG. 11 shows a structural example of the controller 2 in the video switcher of FIG. 9.

The controller 2 is mainly constituted by a CPU 21 and a program memory 22. A key selecting program and a key signal generating program are stored in the program memory 22. The CPU 21 executes these programs in accordance with a signal from the input signal 1, so that it sets a three-dimensional shape which becomes a shape of a key signal, and executes a rendering command generating process for generating a rendering command for rendering a three-dimensional image corresponding to the three-dimensional shape. The rendering command obtained by the rendering command generating process is supplied from the controller 2 to the key signal generating unit 3. The key signal generating unit 3 executes a key signal generating process for generating a key signal in accordance with the rendering command. That is, the rendering command from the controller is received by the three-dimensional rendering unit 11. When receiving the rendering command, the three-dimensional rendering unit 11 renders the three-dimensional image in the frame memory 12 in accordance with the rendering command, and outputs the three-dimensional image as the key signal.

Figure 12:
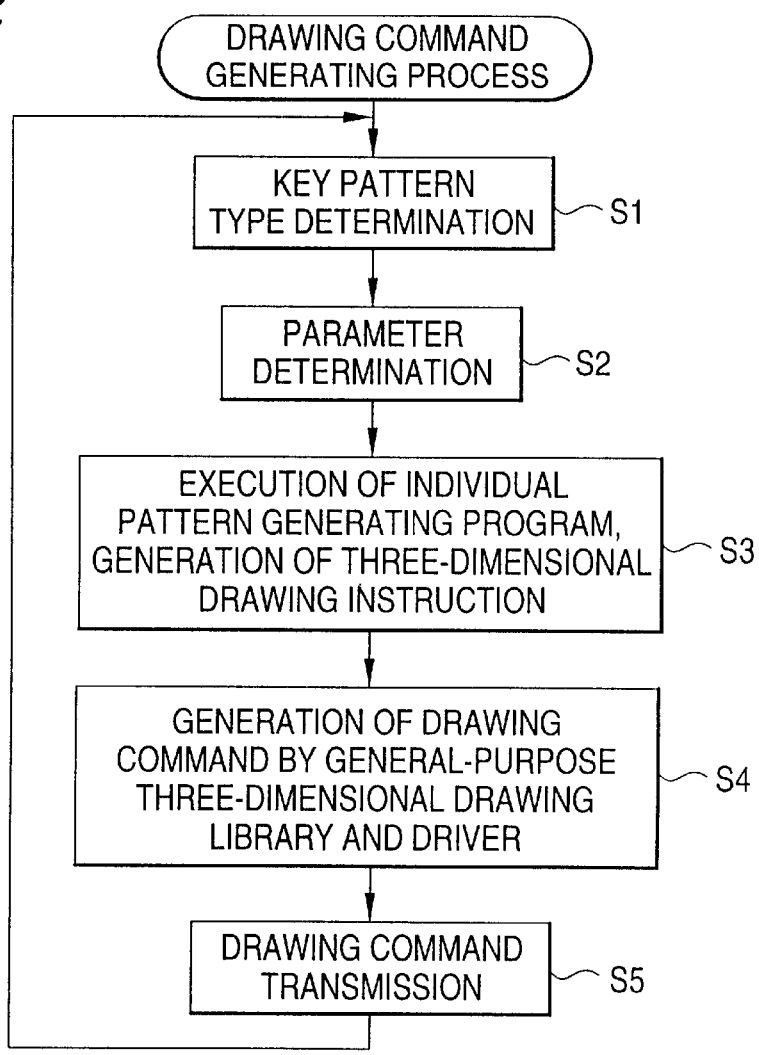
FIG. 12 is a flowchart for explaining a process of the controller 2.

Next, with reference to the flowchart of FIG. 12, the rendering command generating process executed by the CPU 21 of FIG. 11 will be further described.

The rendering command generating process is started in such a manner that a user operates the input unit 1, and a signal corresponding to the operation is supplied to the CPU 21. At step 1, the CPU 21 sets (determines) a three-dimensional shape in accordance with the signal corresponding to the operation, and further, at step S2, sets parameters for specifying the state of the three-dimensional shape (for example, size, position, etc. of the three-dimensional shape) and the way of changing (rotation angle, amount of parallel movement, etc.). Incidentally, setting of the three-dimensional shape and parameters is carried out through execution of the key selecting program by the CPU 21.

The CPU 21 proceeds to step S3, and generates a rendering command (three-dimensional rendering command) for rendering such a three-dimensional image that its three-dimensional shape is set at step S1 and its state and way of changing are set at step S2.

That is, the key signal generating program as a program for generating a rendering command for rendering a three-dimensional image is stored in the program memory 22 of the controller 2. The CPU 21 executes this key signal generating program (individual pattern generating program) so that it generates the rendering command for rendering such a three-dimensional image that its three-dimensional shape is set at step S1 and its state and way of changing are set at step S2.

After generation of the rendering command, the CPU 21 proceeds to step S4, and converts the rendering command generated at step S3 into one exclusively used for the three-dimensional rendering unit 11 included in the key signal generating unit 3 by using, for example, a general-purpose library for three-dimensional image rendering and a three-dimensional API (Application Program Interface) as a driver. Here, as the general-purpose three-dimensional API, there are, for example, OpenGL, Direct3D, and so on.

After the CPU 21 generates the rendering command exclusively used for the three-dimensional rendering unit 11, it proceeds to step S5, and transmits the rendering command to the three-dimensional rendering unit 11 of the key signal generating unit 3. Next, the CPU waits for a signal corresponding to operation of the user from the input unit 1, and returns to step S1.

Figure 13:
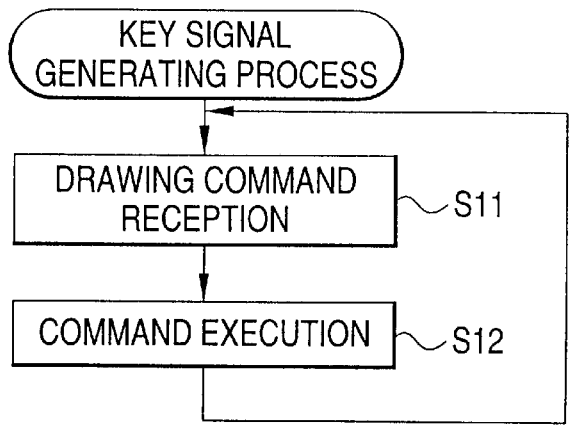
FIG. 13 is a flowchart for explaining a process of the key signal generating unit 3.

Next, with reference to the flowchart of FIG. 13, the key signal generating process executed by the three-dimensional rendering unit 11 of FIG. 9 will be further described.

In the key signal generating process, first of all, at step S11, the three-dimensional rendering unit 11 receives the rendering command transmitted from the controller 2, and proceeds to step S12 and executes the rendering command. By this, the three-dimensional rendering unit 11 executes a rendering process for rendering the three-dimensional image corresponding to the three-dimensional command in the frame memory 12. The three-dimensional rendering unit 11 outputs, as the key signal, the three-dimensional image written in the frame memory 12 to the mixing unit 4, and next, waits for transmission of the rendering command from the controller 2, and returns to step S11.

In the key signal generating unit 3, the three-dimensional rendering unit 11 renders the three-dimensional image in accordance with the rendering command, so that the key signal is generated. Thus, a program for generating a key signal is not stored in the local memory 14.

Figure 14:
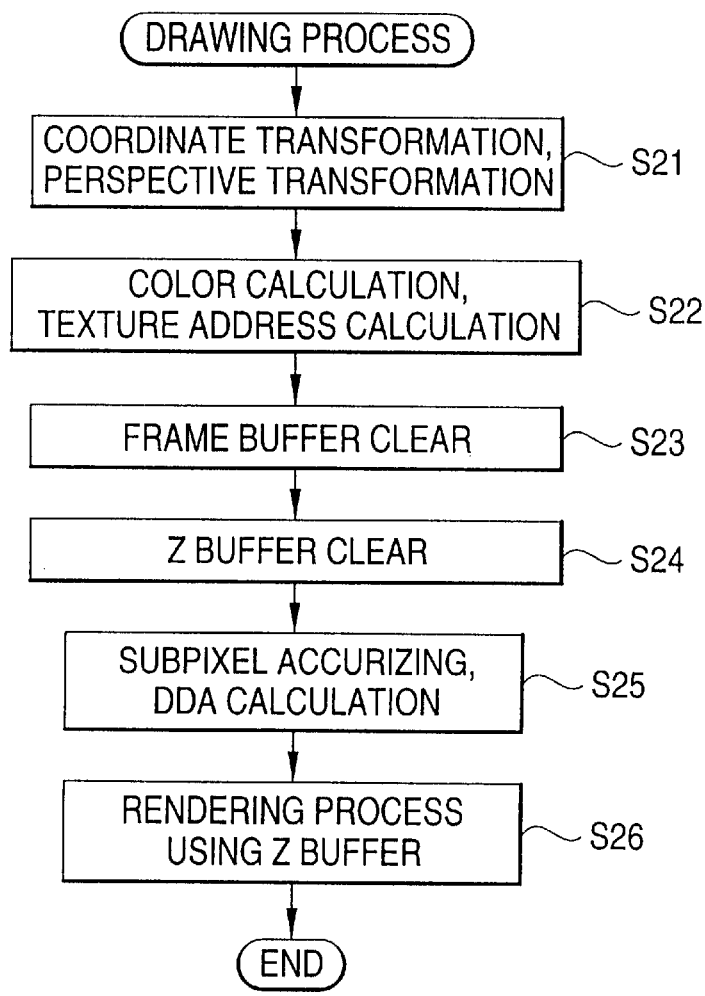
FIG. 14 is a flowchart for explaining a rendering process by a three-dimensional rendering unit 11.

Next, with reference to the flowchart of FIG. 14, the rendering process executed by the three-dimensional rendering unit 11 will be described. Here, as the rendering command, at least coordinate and color information of each vertex of each polygon (generally, a triangle) defining a three-dimensional image in a three-dimensional space are given to the three-dimensional rendering unit 11. Incidentally, as the rendering command necessary for rendering a three-dimensional image, other than those, there are a normal vector at each vertex of a polygon (normal vector at each vertex of a polygon of a three-dimensional shape), position of a light source, color information of the light source, position of a visual point, information with respect to image angles of the three-dimensional image, and so on. The kinds of data given as the rendering command to the three-dimensional rendering unit 11 are increased or decreased by the kind of the three-dimensional image to be rendered by the three-dimensional rendering unit 11.

In the rendering process, first of all, at step S21, the three-dimensional rendering unit 11 applies a geometry process to each polygon in the three-dimensional space on the basis of the position of a visual point, and further converts data after the geometry process by perspective view transformation. Thereafter, the three-dimensional rendering unit 11 proceeds to step S22, and executes chromaticity calculation and texture address calculation as to the polygon in a screen coordinate system after the perspective view transformation, so that polygon data are obtained.

Here, as the polygon data, there are, for example, X, Y, Z, R, G, B, α, S, T, Q, F, and so on.

Among the polygon data X, Y, Z, R, G, B, α, S, T, and Q, the data X, Y, and Z express X, Y, and Z coordinates of each of three vertexes of a triangular polygon, and the data R, G, and B express brightness values of red, green, and blue at each of the three vertexes.

The data α expresses a blend coefficient expressing the ratio of blending in the case where α-blending is carried out between the RGB value of a pixel to be rendered, that is, the pixel which is to be rendered in the frame memory 12 and the RGB value of a rendered pixel, that is, the pixel which has already been rendered in the frame memory 12. Incidentally, the data α is a real number within the range of from 0 to 1, and when the pixel value (RGB value) of the pixel which is to be rendered is made $F_c$, and the pixel value of the pixel which has already been rendered is made $B_c$, a pixel value $C_c$ as an α-blending result of these is given by, for example, the following equation.

$$C_c = \alpha F_c + (1-\alpha)B_c$$

The data S, T, and Q express texture coordinates (homogeneous coordinates as to texture) at each of the three vertexes of the triangular polygon. That is, here, by texture mapping, a (pattern) texture is given to the surface of an object, and the data S, T, and Q are used in this texture mapping. Incidentally, it is designed such that values obtained by multiplying each of S/Q and T/Q by a texture size become a texture address.

The data F expresses a fog value indicating the degree of dimming in the case where a pixel to be rendered is made dim, and for example, as the value is large, the display of the pixel becomes dim.

After the polygon data are obtained, at step S23, the three-dimensional rendering unit 11 clears the frame memory 12 to, for example, 0, and proceeds to step S24, initializes a Z-buffer (not shown) for storing a Z-value as position information concerning the depth of the polygon to, for example, +∞ (here, it is assumed that the Z-value becomes large at the depth side of a screen), and proceeds to step S25. Here, the Z-buffer is built in the three-dimensional rendering unit 11, and is designed such that Z-values for one screen can be stored. Incidentally, the Z-buffer can also be externally provided to the three-dimensional rendering unit 11, similarly to the frame memory 12.

At step S25, the three-dimensional rendering unit 11 makes the coordinates of the vertexes of the polygon have subpixel precision. That is, until this step, the coordinates of the vertexes of the polygon are treated with the precision of, for example, the floating point or the like. However, at step S25, the coordinates are made to have the precision of a subpixel (imaginary pixel of a unit smaller than an actual pixel). Further, step S25, the three-dimensional rendering unit 11 performs DDA (Digital Differential Analize) calculation with the subpixel precision, so that the RGB values or the like of the subpixels for forming the side and the inside of the polygon are obtained.

Here, the DDA calculation is calculation between two points for obtaining each value (RGB value, etc.) concerning pixels forming a line connecting the two points by linear interpolation. That is, for example, one of the two points is made a start point, and the other is made an end point. When some values are given to the start point and the end point, the difference between the value given to the end point and the value given to the start point is divided by the number of pixels existing between the start point and the end point, so that a variation (rate of variation) of the values given to the start point and the end point is obtained. This variation is sequentially added (integrated) to the value given to the start point as a position advances from the start point to the end point, so that the value at each pixel between the start point and the end point is obtained.

For example, concerning a triangular polygon, when subpixels p1, p2, and p3 are given as the three vertexes, such DDA calculation is performed with subpixel precision to the subpixels p1 and p2, the subpixels p2 and p3, and the subpixels p1 and p3. By this, the polygon data Z, R, G, B, α, S, T, and Q concerning the subpixels on the three sides of the polygon, and further, the polygon data Z, R, G, B, α, S, T, and Q concerning the subpixels existing in the inside of the polygon are obtained with X, Y coordinates as variables. That is, by a so-called Gouraud shading method, the polygon data of the subpixels on the lines (sides) connecting the vertexes of the polygon, and the polygon data of the subpixels in the inside of the polygon are obtained.

Then the three-dimensional rendering unit 11 proceeds to step S26, and uses the Z-buffer to write RGB values of pixels forming the polygon into the frame memory 12.

Here, in the three-dimensional rendering unit 11, it is designed that final RGB values written in the frame memory 12 at step 26 are obtained, for example, in the manner described below.

That is, the three-dimensional rendering unit 11 performs texture mapping on the basis of, as the results of the DDA calculation, the polygon data X, Y, Z, R, G, B, α, S, T, and Q concerning each subpixel forming the polygon. Specifically, the three-dimensional rendering unit 11 divides S and T by Q to calculate texture addresses U(S/Q) and V(T/Q), and performs various kinds of filtering, so that color of a texture of each pixel in the X, Y coordinates is calculated. That is, the three-dimensional rendering unit 11 performs various kinds of filtering to the RGB values as texture data (this is also given as a rendering command) corresponding to the texture addresses U and V, and to the RGB values as the result of the DDA calculation. That is, for example, the three-dimensional rendering unit 11 mixes the two RGB values at a predetermined ratio, and further, mixes a predetermined color in accordance with a fog value F, so that the final RGB value of each subpixel forming the polygon is calculated.

At step S26, when a Z-value of the subpixel in which the RGB value is obtained as described above is not higher than a Z-value of the corresponding subpixel stored in the Z-buffer, the three-dimensional rendering unit 11 writes the obtained RGB value into the frame memory 12. Further, the three-dimensional rendering unit 11 renews the stored value of the Z-buffer with the Z-value of the subpixel in which the RGB value is written. In the case where the Z-value of the subpixel in which the RGB value is obtained is larger than the Z-value of the corresponding subpixel stored in the Z-buffer, writing of the RGB value is not performed. In the case where only one of subpixels forming one pixel is written, the RGB value of the subpixel is written in the address of the frame memory 12 corresponding to the pixel including the subpixel. However, in the case where plural ones of subpixels forming one pixel are written, for example, a mean value or the like of RGB values of the plural subpixels is written.

In the manner described above, when the three-dimensional rendering unit 11 completes writing of pixels as to all polygons forming the three-dimensional image, it completes the rendering process.

Figure 6:
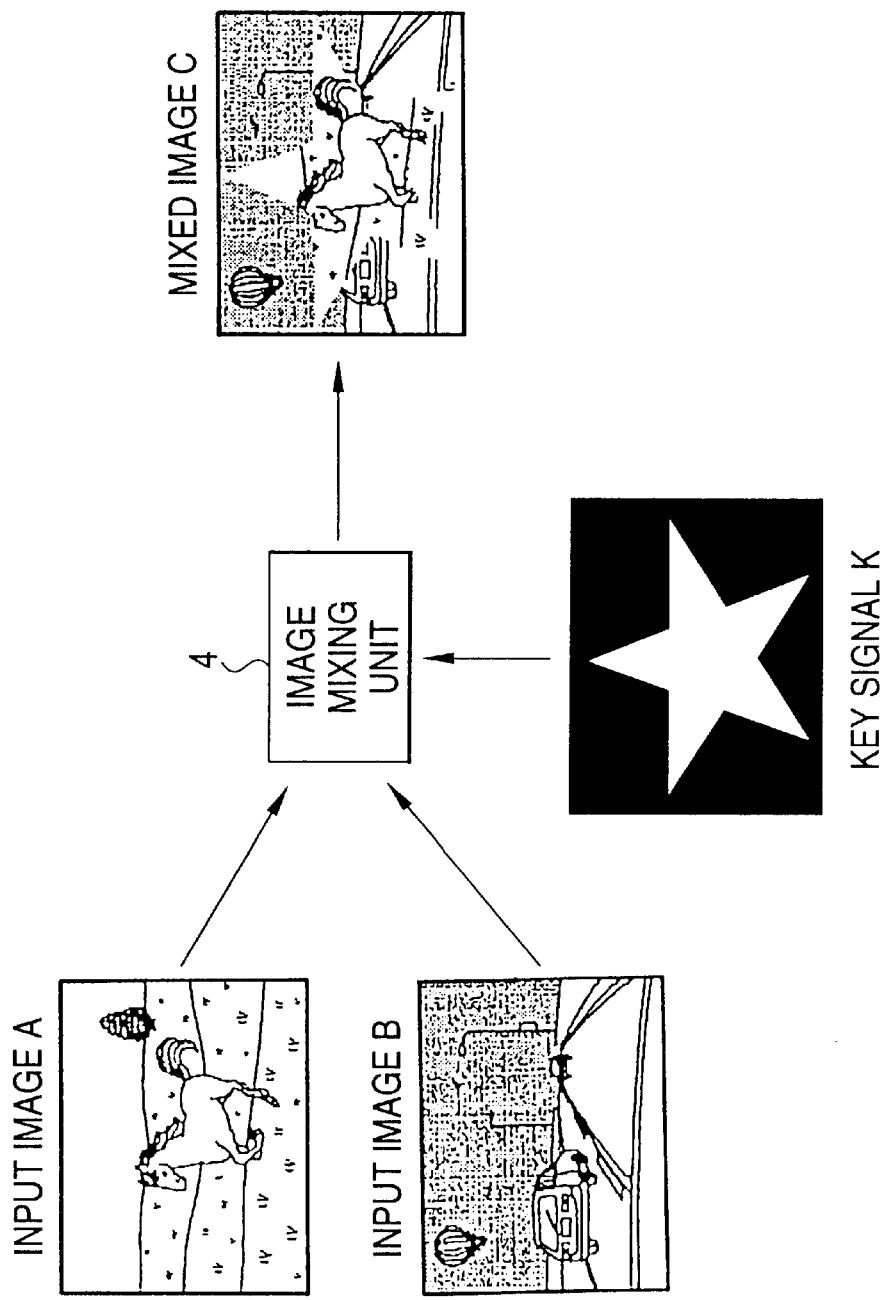
FIG. 6 is a view for explaining a process of a mixing unit 4.
Figure 8:
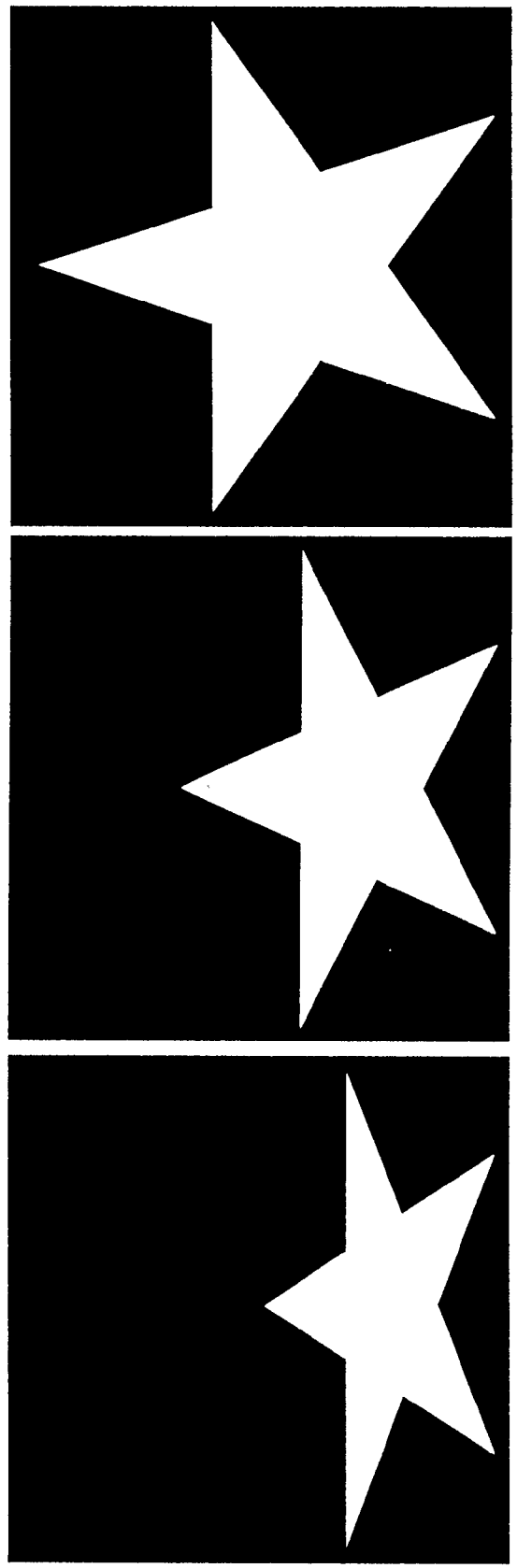
FIG. 8 is a view showing an animation of a key signal realized by the video switcher of FIG. 1.
Figure 15:
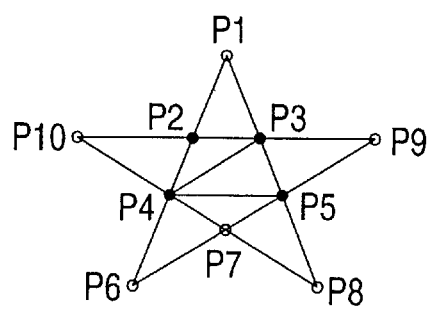
FIG. 15 is a view for explaining data given to the three-dimensional rendering unit 11.

From the above, for example, in the case where a star-shaped key signal as shown n FIG. 6 is generated, for example, if only coordinates and color information of vertexes P1 to P9 forming triangles as polygons forming the star as shown in FIG. 15, and other data necessary for rendering the three-dimensional image are given to the three-dimensional rendering unit 11 together with the rendering command instructing rendering by the Gouraud shading, the three-dimensional image as the star-shaped key signal as shown in FIG. 6 can be rendered.

That is, in the conventional video switcher, in order to generate the star-shaped key signal as shown in FIG. 6, it is necessary that a key signal generating program for calculating, in one pixel unit, pixel values of pixels forming the star is prepared, and this program is made to be executed by the CPU 42 of the key signal generating unit 32, so that the pixel values are written into addresses corresponding to the pixels forming the star in the key signal storing memory 44. On the other hand, in the video switcher of FIG. 9, even if such a key signal generating program is not prepared, when the rendering command, together with the coordinates and color information of the vertexes of the polygons forming the star is given to the three-dimensional rendering unit 11, pixel values of pixels on the sides and in the insides of the polygons are interpolated by the standard function provided in the three-dimensional rendering unit 11, and the key signal as the star-shaped three-dimensional image is rendered in the frame memory 12 at high speed.

Figure 16D:
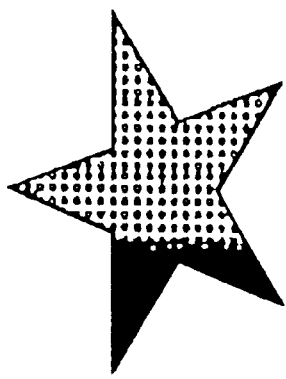
FIG. 16D is a view showing a conventional key signal used in the case where a wipe with gradation is carried out.
Figure 16C:
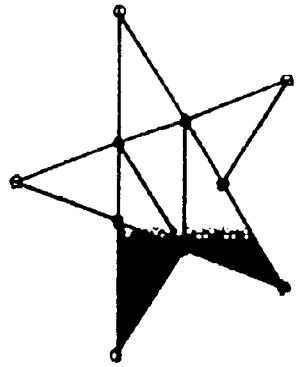
FIGS. 16A to 16C are views showing a key signal according to the invention used in the case where a wipe with gradation is carried out.
Figure 16A:
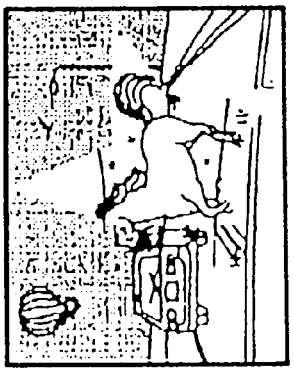
Figure 16B:
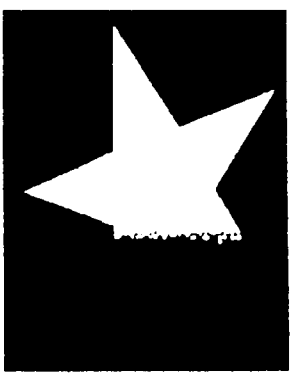

Further, in order to realize a so-called wipe with gradation such that the images A and B as shown in FIG. 6 are mixed to generate an image in which parts thereof are mixed, for example, a mixed image C as shown in FIG. 16A, it is necessary to generate such a key signal, as shown in FIG. 16B, that a part of the star (in FIG. 16B, the left portion of the star) is gradually changed from 0 to 255 (similarly to the case described in FIG. 6, in FIG. 16B, a white portion corresponds to 255 (maximum value of the key signal in this embodiment), a black portion corresponds to 0 (minimum value of the key signal in this embodiment), and a portion with an intermediate density corresponds to a value corresponding to the density). According to the three-dimensional rendering unit 11, it is also possible to easily generate the key signal in which the pixel values are gradually changed as shown in FIG. 16C by the foregoing Gouraud shading or another shading. That is, in the three-dimensional rendering unit 11, if the coordinates of vertexes, color information of the vertexes, normal vectors at the vertexes, position of a light source, color information of the light source, and position of a visual point are given, the shaded three-dimensional image as shown in FIG. 16C can be rendered at high speed. Incidentally, by only calculating and instructing the position and brightness of each vertex of the polygon of FIG. 16C, each pixel in the polygon is automatically interpolated and is painted out.

Figure 2:
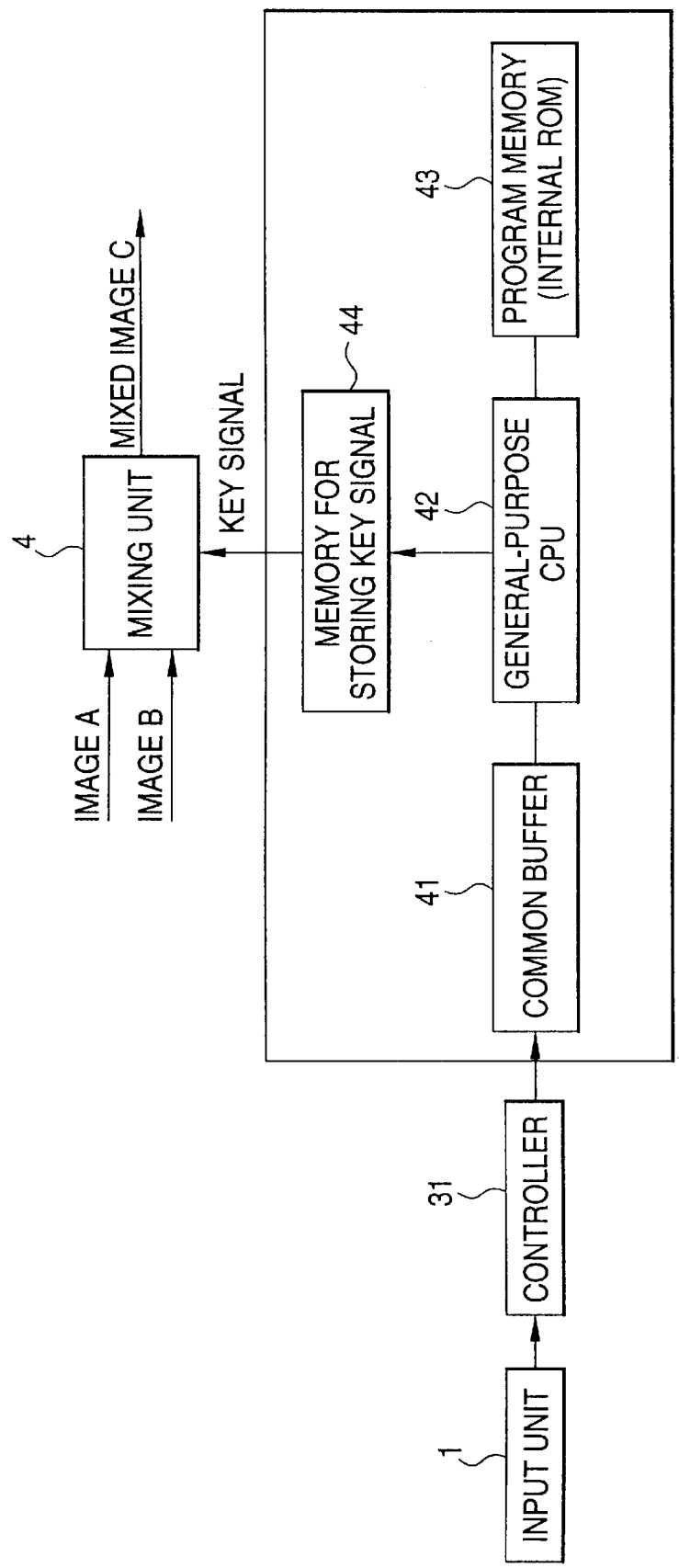
FIG. 2 is a block diagram showing a structural example of a key signal generating unit 32.
Figure 3:
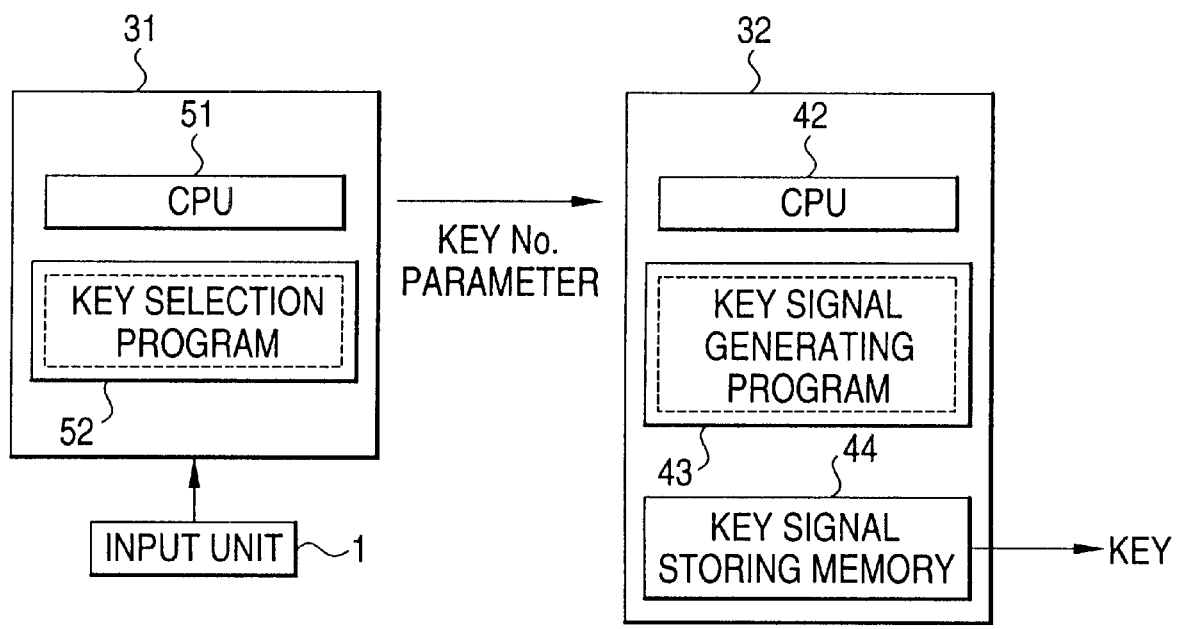
FIG. 3 is a block diagram showing a structural example of a controller 31.
Figure 4:
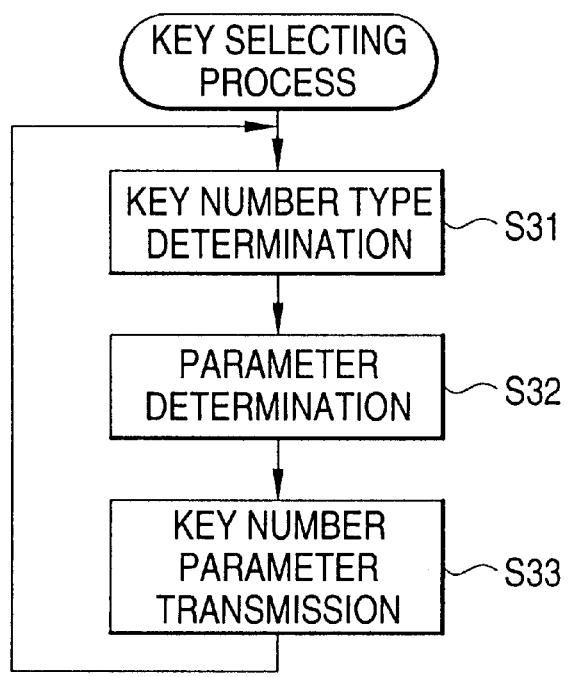
FIG. 4 is a flowchart for explaining a process of the controller 31.
Figure 5:
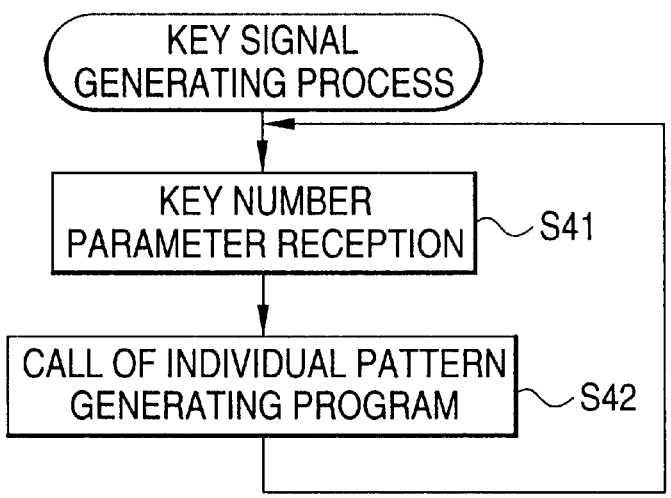
FIG. 5 is a flowchart for explaining a process of the key signal generating unit 32.

On the contrary, in the key signal generating unit 32 of FIG. 2, in order to generate a key signal as shown in FIG. 16B, as shown in FIG. 16D, it is necessary that a key signal generating program for calculating pixel values of pixels forming a star in one pixel unit is prepared, and this program is made to be executed by the CPU 42 of the key signal generating unit 32, so that pixel values are written into addresses corresponding to the pixels forming the star in the key signal storing memory 44.

Figure 17:
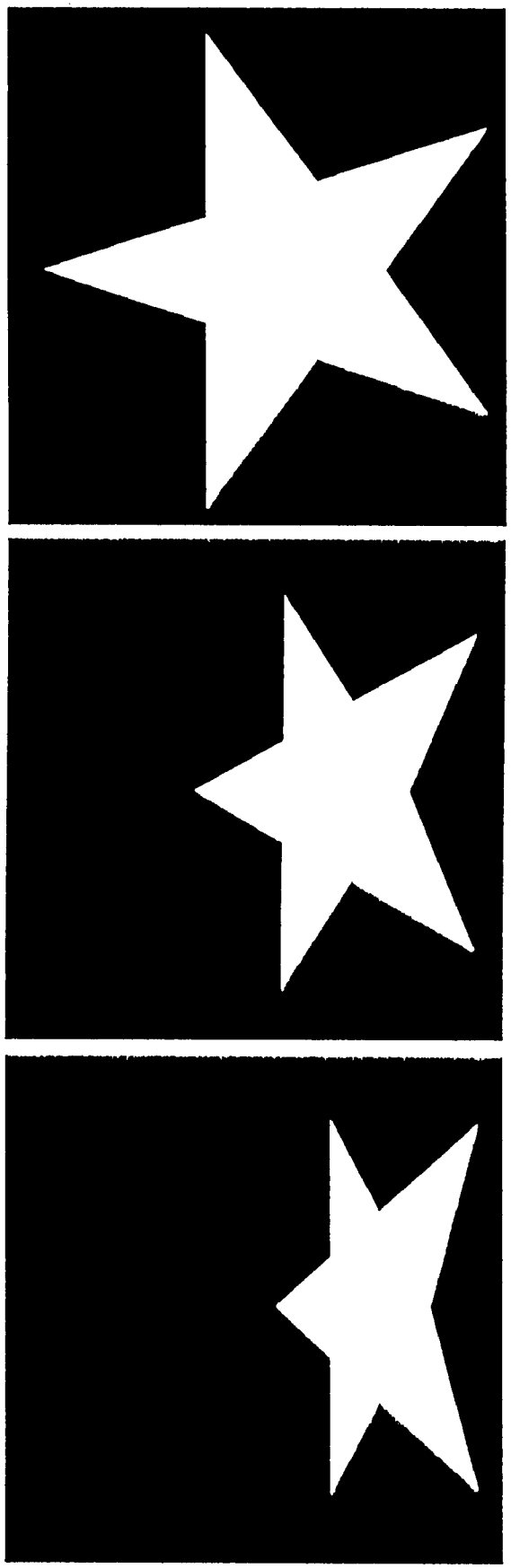
FIG. 17 is a view showing a key signal with accurate perspective.

Besides, in the case where the three-dimensional rendering unit 11 is used, a three-dimensional shape is divided into polygons and they are rendered through a general-purpose three-dimensional API, so that it is possible to render a three-dimensional image corresponding to the three-dimensional shape. Thus, the three-dimensional image with accurate perspective can be easily obtained. Accordingly, for example, as shown in FIG. 17, such an animation that a star rises in the direction from the depth side to this side can be accurately realized, and such a key signal can be easily generated. Further, in this case, in the middle of rising of the star from the depth side to this side, when the color of a light source is made changed, the value of the key signal can be changed. In this case, it is possible to realize such a wipe that the more the star rises in the direction to this side, the more the image displayed in the inside of the star is displayed clearly.

Besides, in the three-dimensional rendering unit 11, since so-called three-dimensional calculation such as a geometry process is carried out in the rendering process, rotation and movement of a three-dimensional shape can be easily carried out. As a result, it is possible to generate key signals with high degree of freedom of motion and with plenty of variations.

As described above, since the three-dimensional image rendered by the three-dimensional rendering unit 11 is outputted as the key signal, it becomes possible to generate various key signals at high speed, and to obtain a mixed image with high degree of freedom of expression.

Besides, in the three-dimensional rendering unit 11, since rendering of the three-dimensional image is performed by rendering polygons, even in a three-dimensional image of a complicated shape, calculation necessary for its rendering can be carried out in a relatively short time. As a result, it becomes possible to realize a complicated wipe, and by this, the quality of a mixed image can be improved.

Besides, since the three-dimensional rendering unit 11 is a device with a high function with respect to a rendering process (writing of an image of a pixel into the frame memory 12), the cost thereof basically reflects the speed of the rendering process. Thus, if a more expensive device is used as the three-dimensional rendering unit 11, the rendering speed can be increased by the expensiveness.

Further, as described above, by making the three-dimensional rendering unit 11 render a polygon by the Gouraud shading or the like, a wipe with gradation can also be easily realized.

Besides, in the embodiment, a personal computer is used as the controller 2. In many personal computers presently put on the market, a library exclusively used for a three-dimensional rendering unit is normally prepared. In this case, since it is not necessary to prepare a routine for performing primitive operations such as rendering of a circle, key selecting programs to be stored in the program memory 22 can be relatively easily prepared. That is, for example, rendering of a polygon in which the colors of its vertexes are specified is supported at a hardware level of the three-dimensional rendering unit 11. Thus, a description for rendering of a polygon can be completed with merely a description for calling one or some libraries.

Further, since an LSI as the three-dimensional rendering unit 11 is less expensive than a general-purpose CPU having the same number of transistors, the cost of the video switcher can be made low.

Besides, in the case where the three-dimensional rendering unit 11 of FIG. 9 and the general-purpose CPU 42 of FIG. 2 have the same bus width, when the three-dimensional rendering unit 11 having a high function with respect to the rendering process is used, access efficiency to the memory (corresponding to the frame memory 12 in FIG. 9, or the key signal storing memory 44 in FIG. 2) in which the key signal is written becomes higher than that in the case where the general-purpose CPU 42 is used.

Further, since a personal computer can be used as the controller 2, the key selecting program and the key generating program to be stored in the program memory 22 can be provided as application programs, and it is possible to easily add a key signal of a new shape or motion (animation). Since the key signal generating unit 3 does not include a program for generating a key signal, when a new key signal is added, it is not necessary to make any change to the key signal generating unit 3. That is, maintenance can be easily made.

Besides, since a general-purpose three-dimensional API, such as OpenGL or Direct3D, can be used, productivity for programs can be improved. That is, in the case where the general-purpose three-dimensional API is used, education and training of a programmer for carrying out programming can be easily made. Since the general-purpose three-dimensional API operates irrespectively of a platform, even if the key signal generating unit 3 is not provided, if only there is a general-purpose computer, it is possible to make development of a key selecting program and a key signal generating program to be stored in the program memory 22 of FIG. 11. Further, even if a device as the three-dimensional rendering unit 11 is changed to a new device, if the new device supports the three-dimensional API which has been supported by the original device, the key selecting program and the key signal generating program stored in the program memory 22 can be used without any change. As a result, portability can be improved.

Incidentally, in this embodiment, although the three-dimensional rendering unit 11 is made to render a three-dimensional image, the three-dimensional rendering unit 11 can also be made to render a two-dimensional image. That is, the three-dimensional rendering unit 11 can be made to perform a rendering process without being given coordinate Z in the depth direction among coordinates X, Y, and Z of a vertex of a polygon.

Besides, here, since a three-dimensional image is used as a key signal, as color information of the vertex, even if all of R, G, and B are not given, it is sufficient if at least one of them is given. Besides, an a-value indicating the ratio of blending can also be directly used.

Further, in this embodiment, although the controller 2, the key signal generating unit 3, and the mixing unit 4 are separately constructed as independent units, it is possible to integrally construct the controller 2 and the key signal generating unit 3, and further, these and the mixing unit 4.

As described above, according to the present invention, a three-dimensional shape defined by at least one unit figure is set, and on the basis of at least a vertex of the unit figure and a pixel value at the vertex, a three-dimensional image corresponding to the three-dimensional shape is rendered. Then the three-dimensional image is outputted as a key signal. Thus, it becomes possible to generate various key signals at high speed.

What is claimed is:

1. An image processing apparatus for mixing a first image and a second image, comprising:

rendering command generating means for generating a rendering command for setting a three-dimensional shape defined by at least one unit figure;

an image memory;

rendering means for rendering a three-dimensional image corresponding to said three-dimensional shape onto said image memory based on said rendering command; and output means for outputting said three-dimensional image rendered on said image memory as a key signal; and mixing means for mixing said first image and said second image in accordance with said key signal.

2. An image processing apparatus according to claim 1, wherein said three-dimensional image is formed of a plurality of polygons.

3. An image processing apparatus according to claim 2, wherein said rendering command includes at least coordinate of each vertex of said polygons in a three-dimensional space and color information.

4. An image processing apparatus for generating a key signal as a signal for controlling transmittance of an image when a first image and a second image are mixed, comprising:

rendering command generating means for generating a rendering command for setting a three-dimensional shape defined by at least one unit figure;

an image memory;

rendering means for rendering a three-dimensional image corresponding to said three-dimensional shape onto said image memory based on said rendering command; and output means for outputting said three-dimensional image rendered on said image memory as said key signal.

5. An image processing apparatus according to claim 4, wherein said three-dimensional image is formed of a plurality of polygons.

6. An image processing apparatus according to claim 5, wherein said rendering command includes at least coordinate of each vertex of said polygons in a three-dimensional space and color information.

7. An image processing apparatus for mixing a first image and a second image, comprising:

an image memory;

receiving means for receiving a rendering command for setting a three-dimensional shape defined by at least one unit figure;

rendering means for rendering a three-dimensional image corresponding to said three-dimensional shape onto said image memory based on said rendering command; and output means for outputting said three-dimensional image rendered on said image memory as a key signal;

mixing means for mixing said first image and said second image in accordance with said key signal.

8. An image processing apparatus according to claim 7, wherein said three-dimensional image is formed of a plurality of polygons.

9. An image processing apparatus according to claim 8, wherein said rendering command includes coordinate of each vertex of said polygons in a three-dimensional space and color information.

10. An image processing method for mixing a first image and a second image, comprising the steps of:

generating a rendering command for setting a three-dimensional shape defined by at least one unit figure;

rendering a three-dimensional image corresponding to said three-dimensional shape onto said image memory based on said rendering command;

outputting said three-dimensional image rendered on said image memory as a key signal; and mixing said first image and said second image in accordance with said key signal.

* * * * *